(12) United States Patent
Sawada

(10) Patent No.: US 8,434,817 B2
(45) Date of Patent: May 7, 2013

(54) SUNSHADE FOR VEHICLE

(75) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/200,352

(22) Filed: Sep. 23, 2011

(65) Prior Publication Data
US 2012/0073768 A1 Mar. 29, 2012

(30) Foreign Application Priority Data

Sep. 28, 2010 (JP) .................................. 2010-217137

(51) Int. Cl.
*B60J 7/047* (2006.01)

(52) U.S. Cl.
USPC ........................ 296/220.01; 160/202; 160/222

(58) Field of Classification Search .................. 160/202, 160/222, 223, 370.21; 296/220.01, 216.04
See application file for complete search history.

(56) References Cited

U.S. PATENT DOCUMENTS

| | | | | |
|---|---|---|---|---|
| 2,602,693 A | * | 7/1952 | Murphy ........................ | 160/202 |
| 3,558,183 A | * | 1/1971 | Sigmund ........................ | 16/93 R |
| 4,114,945 A | * | 9/1978 | Lutz ............................... | 16/93 R |
| 5,005,899 A | * | 4/1991 | Clenet ........................... | 296/214 |
| 5,233,724 A | * | 8/1993 | Lei tert et al. .................. | 16/86 A |
| 5,816,647 A | * | 10/1998 | Farmont .................... | 296/220.01 |
| 6,012,767 A | * | 1/2000 | Farmont ........................ | 296/214 |
| 6,942,286 B2 | * | 9/2005 | Bohm et al. ............. | 296/216.05 |
| 2006/0076805 A1 | * | 4/2006 | Santaolalla Gil et al. .... | 296/214 |
| 2007/0145764 A1 | * | 6/2007 | Uehara et al. ................ | 296/97.4 |
| 2010/0122778 A1 | | 5/2010 | Muranaka et al. | |

FOREIGN PATENT DOCUMENTS

| | | |
|---|---|---|
| JP | 2004-249850 | 9/2004 |
| JP | 2010-120537 | 6/2010 |

* cited by examiner

*Primary Examiner* — David Purol
(74) *Attorney, Agent, or Firm* — Finnegan, Henderson, Farabow, Garrett & Dunner, LLP

(57) ABSTRACT

A sunshade for a vehicle includes a pair of guide rails extended at a side edge of a light passing portion provided on a vehicle roof, the guide rails arranged opposite to each other, plural extending portions formed on each of the guide rails and extending towards the opposite guide rail, the extending portions defining slide recessed grooves, a sliding member supported by the extending portions and slidably provided in each of the slide recessed grooves, an engaging portion formed on said each sliding member, and plural shade panels slidably supported in the slide recessed grooves, respectively, via the sliding member, the shade panels being configured to interoperate each other by an engagement of each of the engaging portions during at least one of an opening operation and a closing operation of the sunshade.

8 Claims, 6 Drawing Sheets

Upward ↕ Downward

Vehicle width direction ↔

SUNSHADE FOR VEHICLE

CROSS REFERENCE TO RELATED APPLICATIONS

This application is based on and claims priority under 35 U.S.C. §119 to Japanese Patent Application 2010-217137, filed on Sep. 28, 2010, the entire content of which is incorporated herein by reference.

TECHNICAL FIELD

This disclosure generally relates to a sunshade for a vehicle.

BACKGROUND DISCUSSION

A known sunshade for a vehicle is disclosed in JP2010-120537A (referred to as patent reference 1). According to the known sunshade for the vehicle disclosed in the patent reference 1, in order to open and close multiple shade panels, which slide along separate grooves, respectively, of a guide rail, interoperating with each other, a driving bush provided at a rear edge of an operating side shade panel comes in contact with an engaging bush provided at a front edge and a rear edge of a driven side shade panel to engage thereto. For the purpose of reducing an impact noise which is generated when the driving bush contacts the engaging bush, the driving bush is made from an elastic member, for example, rubber.

Another known sunshade for a vehicle is disclosed in JP2004-249850A (referred to as patent reference 2). According to the known sunshade for the vehicle disclosed in the patent reference 2, a contact pin provided at the rear edge of the operating side shade panel is configured to contact a driven contact pin provided at a front edge of a driven side shade panel to close the driven side shade panel, and a rear edge of the operating side shade panel is configured to contact a rear edge flange portion of the driven side shade panel to open the driven side shade panel.

However, according to the sunshade for the vehicle disclosed in the patent reference 1, because the driving bush and the engaging bush are provided on each of shade panels which are readily deformable, in a case where a large load is applied in an upward and downward direction or in a case where each of the shade panels are operated with impetus, the driving bush may overpass the engaging bush and disengage therefrom.

Further, according to the sunshade for the vehicle disclosed in the patent reference 2, because the contact pin and the driven contact pin are positioned between the operating side shade panel and the driven side shade panel, a thickness of the multiple-plates sunshade is increased.

A need thus exists for a sunshade for a vehicle which is not susceptible to the drawback mentioned above.

SUMMARY

In light of the foregoing, the disclosure provides a sunshade for a vehicle, which includes a pair of guide rails extended at a side edge of a light passing portion provided on a vehicle roof, the guide rails arranged opposite to each other, plural extending portions formed on each of the guide rails and extending towards the opposite guide rail, the extending portions defining slide recessed grooves, a sliding member supported by the extending portions and slidably provided in each of the slide recessed grooves, an engaging portion formed on said each sliding member, and plural shade panels slidably supported in the slide recessed grooves, respectively, via the sliding member, the shade panels being configured to interoperate each other by an engagement of each of the engaging portions during at least one of an opening operation and a closing operation of the sunshade.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a sunshade for a vehicle will be explained with reference to illustrations of drawing figures as follows.

Figure 1:
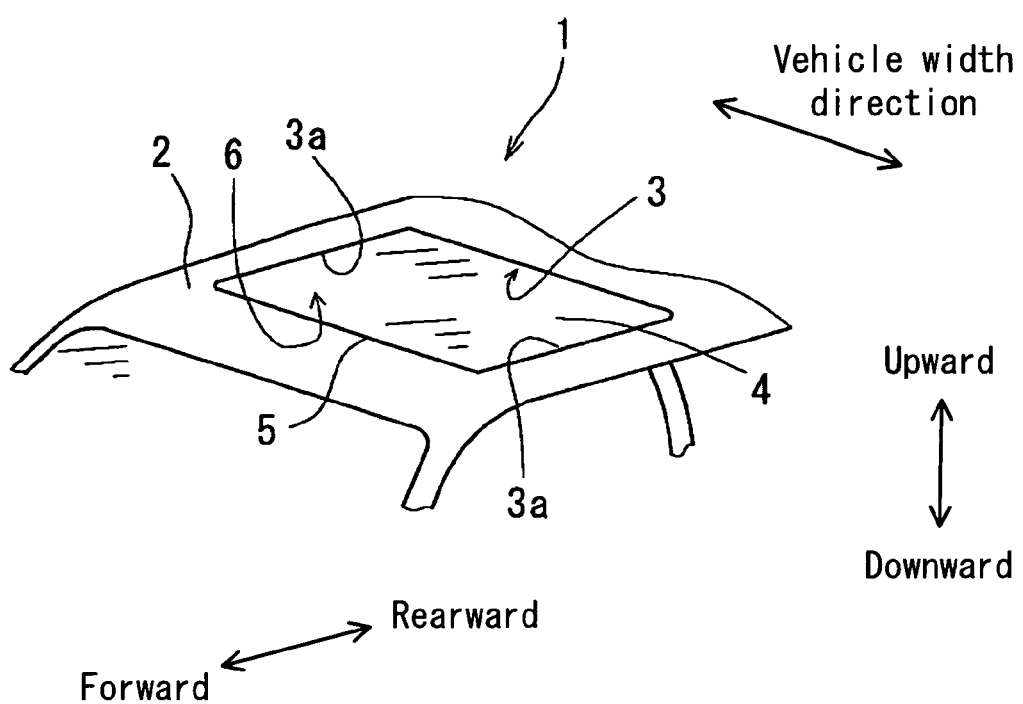
FIG. 1 is a perspective view of an automobile roof to which a sunshade according to a first embodiment disclosed here is mounted.
Figure 2:
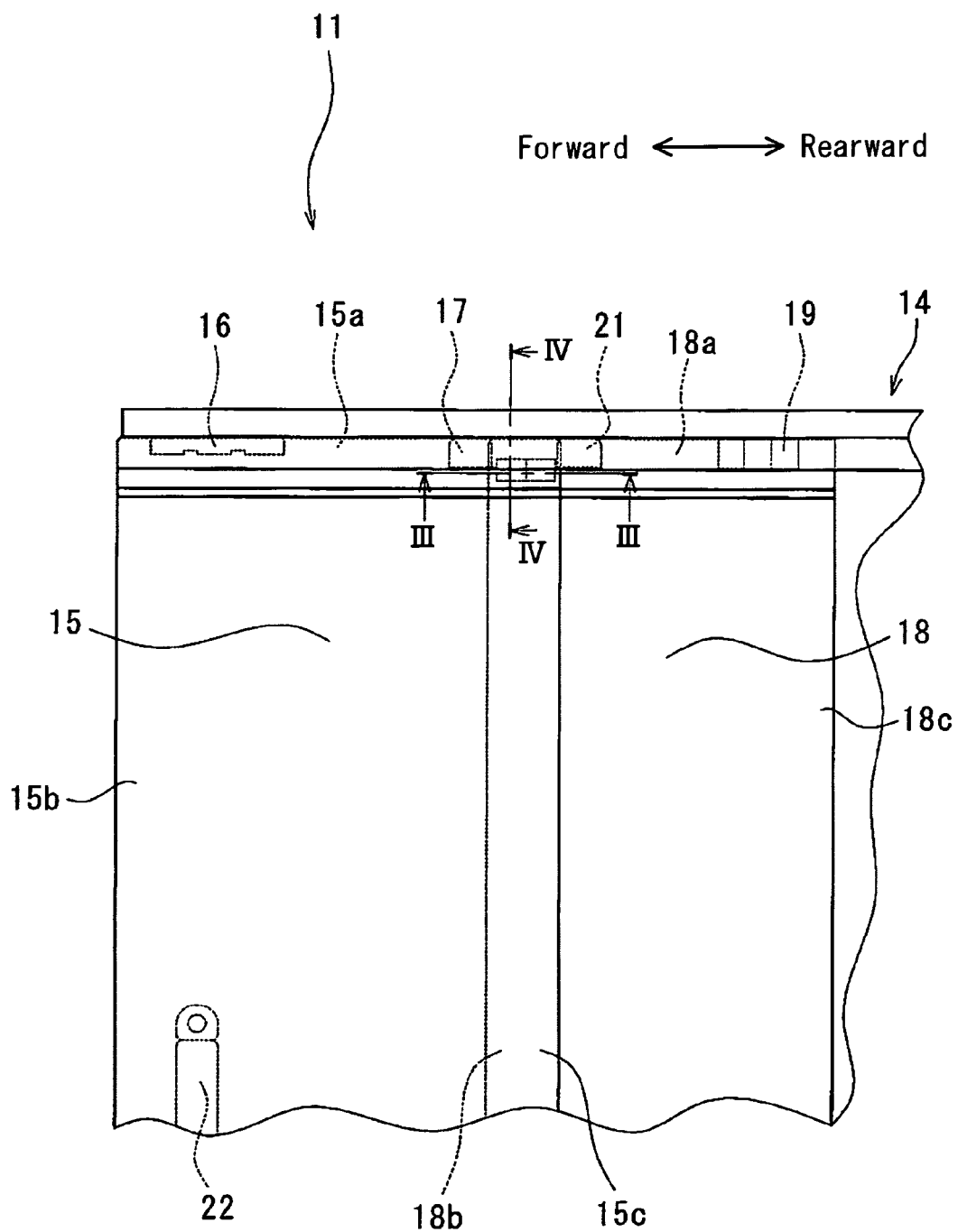
FIG. 2 is a partial plan view showing a fully closed state of the sunshade according to the first embodiment disclosed here.

As shown in FIG. 1, a sunshade for a vehicle according to the embodiment is provided on a roof 1 of an automobile. A roof panel 2 forming the roof 1 includes a light passing portion 3 for taking in sunlight and a resin panel 4 made from transparent resin is provided at the light passing portion 3. A sealing member is provided at an outer peripheral portion 5 of the resin panel 4 for preventing an infiltration of rainwater to a vehicle compartment. A sunshade 11 serving as a sunshade for a vehicle, shown in FIG. 2, is provided at a surface 6 inside the vehicle compartment in the vicinity of a side edge 3a of the light passing portion 3 of the roof panel 2. By opening and closing the sunshade 11, lighting and shielding of the light is performed at the light passing portion 3.

For an explanatory purpose, only one side of the sunshade 11 in a vehicle width direction 12 is shown in FIGS. 2 to 6, the sunshade 11 includes a symmetrical configuration and thus the same structure is applied to the other side of the sunshade 11 in the vehicle width direction 12. A pair of guide rails 14 which are formed by extruding, for example, aluminum and which extend in a front-rear direction (i.e., serving as an opening and closing direction) are fixed to the surface 6 inside the vehicle compartment in the vicinity of the side edge 3a of the light passing portion 3 of the roof panel 2 by means of, for example, bolts. The guide rails 14 are arranged to face each other (i.e., opposite to each other) in the vehicle width direction 12. A first shade panel 15 is slidably supported by the guide rails 14 via a pair of first shoes 16 and a pair of first engaging shoes 17 serving as a sliding member, where each of the first shoes 16 is provided at each of the guide rails 14 and each of the engaging shoes 17 is provided at each of the guide rails 14. A second shade panel 18 is supported by the guide rails 14 via a pair of second shoes 19 and a pair of second engaging shoes 21 serving as a sliding member, where each of the second shoes 19 is provided at each of the guide rails 14 and each of the second engaging shoes 21 is provided at each of the guide rails 14. Each of the first shoes 16 is provided at a front portion of an end portion 15a of the first shade panel 15 in a vehicle width direction. Each of the first engaging shoes 17 is provided at a rear portion of the end portion 15a of the first shade panel 15 in the vehicle width direction. Each of the second engaging shoes 21 is provided at a front portion of an end portion 18a of the second shade panel 18 in the vehicle width direction. Each of the second shoes 19 is provided at a rear portion of the end portion 18a of the second shade panel 18 in the vehicle width direction. Further, an operation knob 22 for opening and closing the first shade panel 15 and the second shade panel 18 is provided at a front end portion 15b of the first shade panel 15 at an inside of the vehicle compartment.

Figure 3:
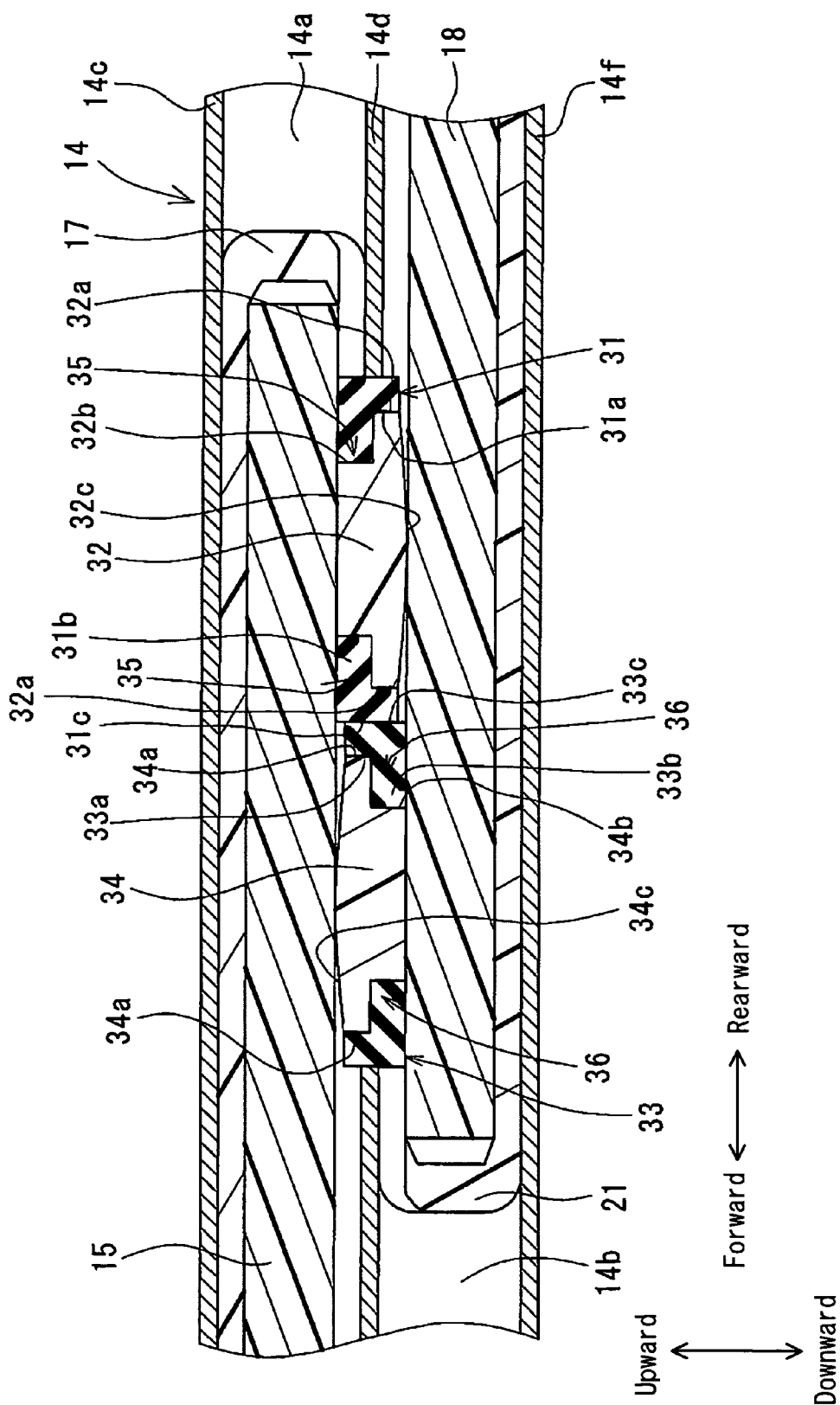
FIG. 3 is a cross-sectional view of a guide rail and engaging shoes taken on line III-III in FIG. 2, the cross section being perpendicular to a vehicle width direction, according to the first embodiment disclosed here.
Figure 4:
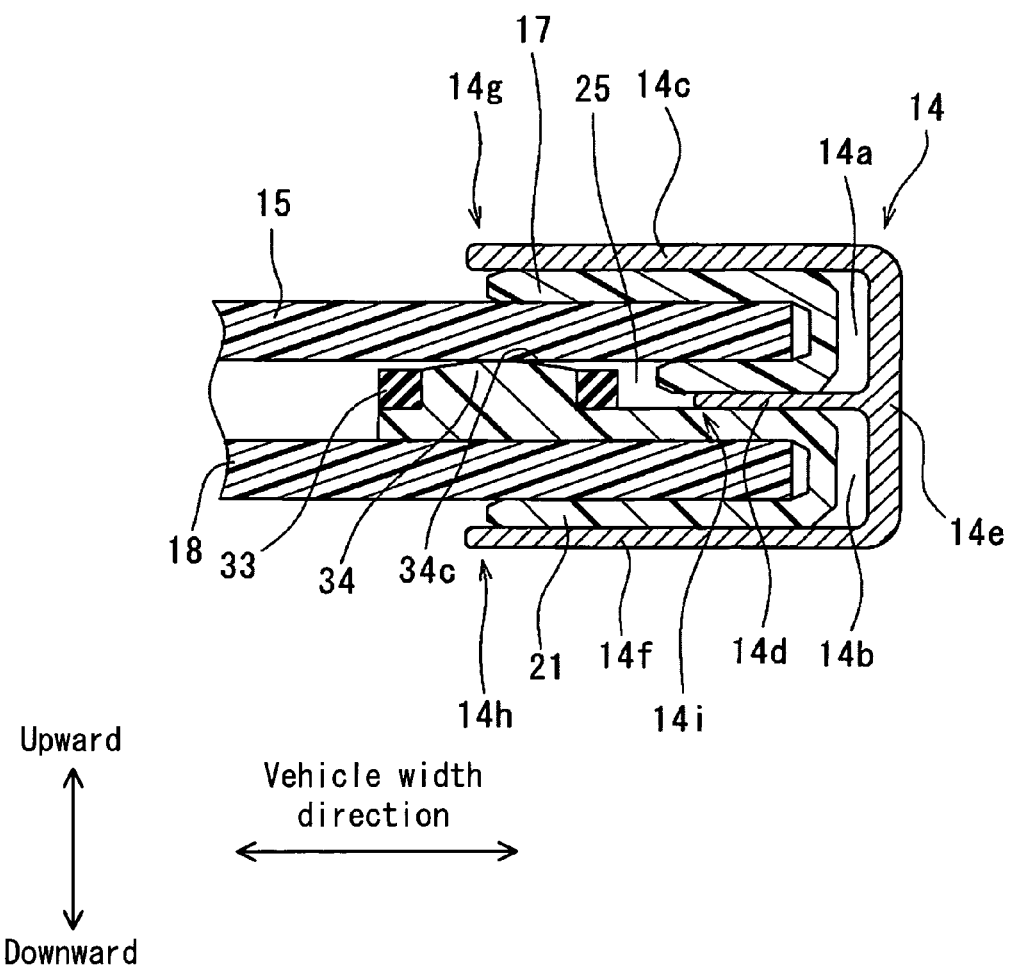
FIG. 4 is a cross-sectional view of the guide rail and the engaging shoes taken on line IV-IV in FIG. 2, the cross section being perpendicular to a front-rear direction of the vehicle, according to the first embodiment disclosed here.

As shown in FIGS. 3 and 4, the guide rail 14 includes a first groove portion 14a serving as a sliding recessed groove and a second groove portion 14b serving as a sliding recessed groove which are arranged one on top of the other to be in parallel to each other to extend in a front-rear direction (forward-rearward direction) of the vehicle. The first groove portion 14a and the second groove portion 14b are formed to have an opening which opens in an inwards of a vehicle width direction. The first groove portion 14a is positioned above the second groove portion 14b. The first groove portion 14a is defined by an upper end extending portion 14c (i.e., serving as an extending portion, upper extending portion) extending in the vehicle width direction, an intermediate extending portion 14d (i.e., serving as an extending portion), and a side wall portion 14e extending in an up-down direction (i.e., upward-downward direction) of the vehicle. The second groove portion 14b is defined by a lower end extending portion 14f (i.e., serving as an extending portion, a lower extending portion) extending in the vehicle width direction, the intermediate extending portion 14d and the side wall portion 14e. A tip end 14g of the upper end extending portion 14c and a tip end 14h of the lower end extending portion 14f are positioned inward in the vehicle width direction relative to a tip end 14i of the intermediate extending portion 14d (i.e., serving as a tip end of an intermediate extending portion). An extending length (amount) of the intermediate extending portion 14d in the vehicle width direction is shorter than the upper end extending portion 14c and the lower end extending portion 14f, and a void region 25 is formed in the vicinity of the tip end 14i of the intermediate extending portion 14d.

The first shoe 16 and the first engaging shoe 17 fit into the first groove portion 14a to slidably support the first shade panel 15. The second shoe 19 and the second engaging shoe 21 fit into the second groove portion 14b to slidably support the second shade panel 18. A first protruding portion 32 (i.e., serving as an engaging portion) on which a first rubber member 31 (i.e., serving as an elastic member) is fitted is provided on the first engaging shoe 17 to protrude in a downward direction of the vehicle. The second engaging shoe 21 includes a second protruding portion 34 (i.e., serving as an engaging portion) on which a second rubber member (i.e., serving as an elastic member) is fitted. The second protruding portion 34 protrudes in an upward direction of the vehicle. A pair of first stepped positions 32b recessed in the front-rear direction of the vehicle is formed on a first vertical surface 32a (i.e., serving as a vertical surface) of the first protruding portion 32 in the front-rear direction of the vehicle. The first rubber member 31 includes a first rubber fitting surface 31a, which fits to the first protruding portion 32, and a first rubber retaining portion 31b which is formed protruding in the front-rear direction of the vehicle. The first rubber retaining portion 31b fits into a pair of first rubber retaining grooves 35 (i.e., serving as a retaining groove) defined by the first stepped portions 32b and the first shade panel 15 to retain the first rubber member 31. Similarly, a pair of second stepped portions 34b is formed on a second vertical surface 34a (i.e., serving as a vertical surface) of the second protruding portion 34, and a second rubber retaining groove 36 (i.e., serving as a retaining groove) is defined by the second stepped portion 34b and the second shade panel 18. A second rubber retaining portion 33b at a second rubber fitting surface 33a fits into the second rubber retaining groove 36 to retain a second rubber member 33. A first protruding surface (i.e., serving as an end portion) 32c is an end surface of the first protruding portion 32 which faces downward and slidably contacts the second shade panel 18. A second protruding end surface 34c (i.e., serving as an end portion) is an end surface of the second protruding portion 34 which faces an upward and slidably contacts the first shade panel 15. A first contact surface 31c corresponds to a side surface of the first rubber member 31 which faces the forward direction of the vehicle. A second contact surface 33c corresponds to a side surface of the second rubber member 33 which faces the rearward direction of the vehicle and is configured to contact the first contact surface 31c. Because the tip end 14g of the upper end extending portion 14c and the tip end 14h of the lower end extending portion 14f overlap with the first protruding portion 32 and the second protruding portion 34, the first protruding portion 32 and the second protruding portion 34 are supported by the guide rail 14 in an up-down direction of the vehicle, and are positioned within the void region 25. In those circumstances, that the tip end 14g of the upper end extending portion 14c and the tip end 14h of the lower end extending portion 14f overlap with the first protruding portion 32 and the second protruding portion 34 corresponds to that the upper end extending portion 14c and the tip end 14h of the lower end extending portion 14f are piled in the up-down direction of the vehicle relative to the first protruding portion 32 and the second protruding portion 34.

Figure 5:
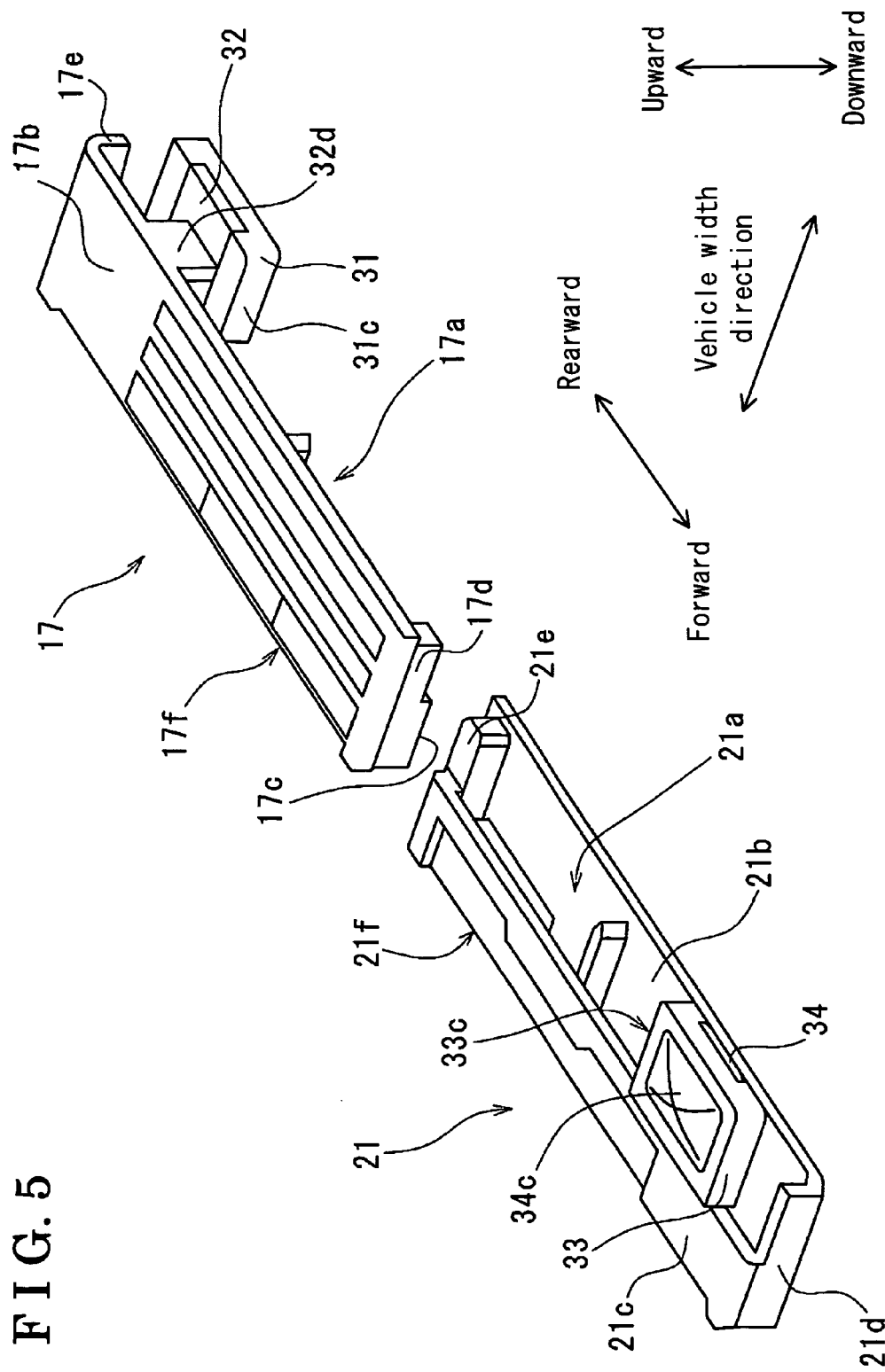
FIG. 5 is a perspective view of the engaging shoes according to the first embodiment disclosed here.

As illustrated in FIG. 5, the first engaging shoe 17 is made of resin and formed in a rectangular shape which extends in the front-rear direction of the vehicle and includes a first shade retaining portion 17a including a recessed portion which opens inwardly in the vehicle width direction. The first shade retaining portion 17a is defined by a first upper surface wall portion 17b, a first lower surface wall portion 17c, a first front end portion 17d, a first rear end portion 17e, and a first side wall portion 17f. The first lower surface wall portion 17c does not overlap with the first protruding portion 32 in the vehicle width direction, however, the first upper surface wall portion 17b extends in the vehicle width direction to be longer than the first lower surface wall portion 17c so as to overlap with the first protruding portion 32. The first protruding portion 32 formed in the rectangular shape extending in the front-rear direction of the vehicle is formed on the first upper surface wall portion 17b via a first protruding leg portion 32d. The first protruding portion 32 is positioned in the downward direction of the vehicle relative to the first upper surface wall portion 17b. The first protruding portion 32 protrudes in the front-rear direction of the vehicle relative to the first protruding leg portion 32d. The first protruding portion 32 is covered with the first rubber member 31 which is formed in a rectangular shape having an opening therein. A first protruding end surface 32c corresponds to a crowning curved surface which is curved to protrude in the downward direction of the vehicle.

The first protruding end surface 32c is arranged to protrude compared to the first rubber member 31 in the downward direction of the vehicle. The end portion 15a of the first shade panel 15 in a vehicle width direction which is formed to be recessed so as not to interfere with the first protruding leg portion 32d and the first front end portion 17d fits into the first shade retraining portion 17a to be retained thereat. The second engaging shoe 21 includes the identical configuration with the first engaging shoe 17 and is arranged in an inverted position.

A closing operation of the sunshade 11 will be explained as follows. In a fully open state of the sunshade 11, the first shade panel 15 and the second shade panel 18 overlap each other in the up-down direction and are accommodated in a rearward portion of the roof panel 2 on which the light passing portion 3 is not provided. When the operation knob 22 is operated to apply the force in the forward direction of the vehicle to the first shade panel 15, only the first shade panel 15 slides in the forward direction of the vehicle along the first groove portion 14a via the first shoes 16 and the first engaging shoes 17. In those circumstances, the first upper surface portion 17b of the first engaging shoe 17 slides relative to the upper end extending portion 14c of the guide rail 14, and the first lower surface wall portion 17c slides relative to the intermediate extending portion 14d. Further, the first protruding end surface 32c slides relative to the second shade panel 18, and the second protruding end surface 34c slides relative to the first shade panel 15. As a first shade rear end portion 15c comes to closer to a second shade front end portion 18b to overlap each other in the up-down direction of the vehicle, each of the first engaging shoes 17 and each of the second engaging shoes 21 starts overlapping in the up-down direction of the vehicle. Then, a distance between the first protruding portion 32 of the first engaging shoe 17 and the second protruding portion 34 of the second engaging shoes 21 in the front-rear direction of the vehicle is reduced, and the first contact surface 31c of the first rubber member 31 contacts the second contact surface 33c of the second rubber member 33 in the front-rear direction. Thus, the first protruding portion 32 and the second protruding portion 34 engage with each other in the front-rear direction, and the force applied to the operation knob 22 in the forward direction of the vehicle is transmitted to the second shade panel 18 via the engagement between the first protruding portion 32 and the second protruding portion 34. The first shade panel 15 and the second shade panel 18 slide together in the forward direction of the vehicle in a state where the first shade rear end portion 15c and the second shade front end portion 18b overlap each other. In those circumstances, the first upper surface wall portion 17b slides relative to the upper end extending portion 14c, the first lower surface wall portion 17c slides relative to the intermediate extending portion 14d, a second upper surface wall portion 21c of the second engaging shoe 21 slides relative to the intermediate extending portion 14d, and a second lower surface wall portion 21b slides relative to the lower end extending portion 14f. Further, the first protruding end surface 32c and the second protruding end surface 34c do not slide relative to the first shade panel 15 and the second shade panel 18, respectively. The front end portion 15b of the first shade panel 15 comes to contact a stopper to stop moving, and the light passing portion 3 is shielded by the first shade panel 15 and the second shade panel 18 to establish a fully closed state. Further, even in a case where a force in the up-down direction of the vehicle to disengage the first engaging shoe 17 and the second engaging shoe 21 is applied, for example, when the first protruding portion 32 and the second protruding portion 34 contact each other with impetus, or with force, the first protruding portion 32 and the second protruding portion 34 are supported by the upper end extending portion 14c and the lower end extending portion 14f to maintain a relative position in the up-down direction of the vehicle.

An opening operation of the sunshade 11 will be explained as follows. When opening the sunshade, upon the application of the force to the operation knob 22 in the rearward direction of the vehicle, the engagement of the first protruding portion 32 and the second protruding portion 34 is canceled, and only the first shade panel 15 slides in the rearward direction. By contacting the first shoe 16 of the first shade panel 15 to the second engaging shoe 21 of the second shade panel 18, the first shoe 16 and the second engaging shoe 21 are engaged in the front-rear direction of the vehicle. The first shade panel 15 and the second shade panel 18 slide together in a state where the first shade panel 15 and the second shade panel 18 overlap each other, and a rear end portion 18c of the second shade panel 18 contacts a stopper to stop the movement of the first shade panel 15 and the second shade panel 18 to establish the fully open state at which the light can be taken in from the light passing portion 3.

According to the construction of the sunshade 11, the first engaging shoe 17 and the second engaging shoe 21 on which the first protruding portion 32 and the second protruding portion 34 serving as the engaging portion are formed, respectively, are supported by the upper end extending portion 14c and the lower end extending portion 14f in the up-down direction of the vehicle. According to the foregoing construction, compared to a construction that the first protruding portion 32 and the second protruding portion 34 are provided on the first shade panel 15 and the second shade panel 18 whose rigidity is lower than the first engaging shoe 17 and the second engaging shoe 21, a rigidity in the up-down direction of the vehicle when the first protruding portion 32 and the second protruding portion 34 are engaged is enhanced thus restraining a relative displacement of the first protruding portion 32 and the second protruding portion 34. Thus, even if the first protruding portion 32 and the second protruding portion 34 roughly contact each other, the relative displacement of the first protruding portion 32 and the second protruding portion 34 in the up-down direction of the vehicle is restrained, thus enhancing a certainty of the engagement by restraining the disengagement. Further, because the relative displacement is restrained by enhancing the rigidity of the engagement of the first protruding portion 32 and the second protruding portion 34 in the up-down direction of the vehicle, a protruding amount of the first protruding portion 32 and the second protruding portion 34 is reduced, a relative distance between the first engaging shoe 17 and the second engaging shoe 21 in the up-down direction of the vehicle is reduced, and a thickness of the sunshade 11 is reduced. Further, because the first protruding portion 32 and the second protruding portion 34 are integrally formed with the first engaging shoe 17 and the second engaging shoe 21, respectively, an increase in the number of parts is avoided and manufacturing costs and an assembling time can be reduced. Further, when applying a sunshade to various types of vehicles, the first engaging shoe 17, the second engaging shoe 21, and the guide rail 14 can be applied to the various types of vehicles and only shade panels are changed depending on the types of the vehicle, expansion of the application to different types of vehicles is assumed to be easy, and thus contributing to timely provide a new model to the market.

Further, by extending the upper end extending portion 14c and the lower end extending portion 14f in the vehicle width direction so that the tip end 14g of the upper end extending portion 14c and the tip end 14h of the lower end extending portion 14f overlap with the first protruding portion 32 and the second protruding portion 34, the rigidity of the first protruding portion 32 and the second protruding portion 34 when engaged is enhanced to securely support the first protruding portion 32 and the second protruding portion 34. Because the rigidity of the engagement of the first protruding portion 32 and the second protruding portion 34 is enhanced, the rigidity of the first shade panel 15 and the second shade panel 18 is allowed to be reduced, which allows to enhance the degree of freedom in terms of selecting materials and manufacturing costs for materials can be reduced. Further, because an extending length of the intermediate extending portion 14d in the vehicle width direction is smaller than the upper end extending portion 14c and the lower end extending portion 14f, the void region 25 can be provided in the vicinity of the tip end 14i of the intermediate extending portion 14d. By accommodating the first protruding portion 32 and the second protruding portion 34 within the void region 25, a thickness of the sunshade 11 can be reduced. Thus, even if the sunshade 11 is provided at the roof, space over a head of a driver and occupants is not reduced, and a comfortable headroom can be maintained.

Further, because the first rubber member 31 and the second rubber member 33 are provided on the first protruding portion 32 and the second protruding portion 34, respectively, an impact when the first protruding portion 32 and the second protruding portion 34 contact at the engagement therebetween is mitigated to restrain a generation of noises, thus enhancing quietness.

The first protruding end surface 32c and the second protruding end surface 34c protrude relative to the first rubber member 31 and the second rubber member 33, respectively, in protruding directions of the first protruding portion 32 and the second protruding portion 34. According to the foregoing construction, the opening and closing operation of the sunshade 11 is performed without a direct sliding contact between the first rubber member 31 and the second shade panel 18, and between the second rubber member 33 and the first shade panel 15. Accordingly, a generation of a jam or sticking due to trapping of the first rubber member 31 and the second rubber member 33 when opening and closing the sunshade 11 is restrained, which smoothes an operational feeling and enhances texture. Further, a generation of noises by a stick-slip phenomenon caused by a sliding movement of rubber members over the panels can be restrained, thus enhancing quietness.

Further, because the first rubber member 31 and the second rubber member 33 fit into the first rubber retaining groove 35 and the second rubber retaining groove 36, respectively, the first rubber member 31 and the second rubber member 33 are securely retained at the first protruding portion 32 and the second protruding portion 34. Further, by fitting the first rubber member 31 and the second rubber member 33 into the first rubber-retaining groove 35 and the second rubber-retaining groove 36, positioning is readily determined and an assembling accuracy is enhanced.

The above-explained embodiment may be modified as follows.

According to the foregoing embodiment, the first rubber member 31 and the second rubber member 33 are fixed to the first rubber retaining groove 35 and the second rubber retaining groove 36, respectively, formed on the first vertical surface 32a and the second vertical surface 34a, respectively. However, the first rubber member 31 and the second rubber member 33 may be fixed to surfaces other than the first vertical surface 32a and the second vertical surface 34a. Further, a fixing method is not limited to the fitting engagement, and, for example, the first rubber member 31 and the second rubber member 33 may be fixed to the surfaces by bonding.

According to the embodiment, the first rubber member 31 and the second rubber member 33 are provided at the first protruding portion 32 and the second protruding portion 34, respectively. However, an elastic member may be provided on only one of the first protruding portion 32 and the second protruding portion 34. Alternatively, instead of providing the elastic member, the first protruding portion 32 and the second protruding portion 34 may be made of, for example, resin having high acoustic absorption performance and a high damping ratio. Further, a portion having a large degree of deforming amount may be integrally formed on the first protruding portion 32 and the second protruding portion 34 to absorb an impact.

According to the embodiment, entire surfaces of the first protruding end surface 32c and the second protruding end surface 34c protrude in the up-down direction of the vehicle. However, the first protruding end surface 32c and the second protruding end surface 34c may be structured so that a portion of the surfaces of the first protruding end surface 32c and the second protruding end surface 34c protrude in the up-down direction of the vehicle.

According to the embodiment, the first engaging shoe 17 and the second engaging shoe 21 are configured to engage each other during the closing operation of the sunshade 11. However, the construction is not limited to the foregoing, and the first engaging shoe 17 and the second engaging shoe 21 may be configured to engage each other during the opening operation of the sunshade 11. Further, the first engaging shoe 17 and the second engaging shoe 21 may be configured to engage each other both during the closing operation and during the opening operation of the sunshade 11.

According to the embodiment, the resin panel 4 is provided separately from the roof panel 2. However, the construction is not limited to the foregoing, and the resin panel 4 and the roof panel 2 may be integrally formed.

According to the embodiment, the sunshade 11 is applied for selectively taking in the light for a fixed type sunroof. However, the sunshade 11 may be applied to other types of sunroofs, for example, a flip out type sunroof which is a sliding type or fixed by a hinge. Further, the sunshade 11 may be opened and closed manually or by an electric actuation.

Figure 6:
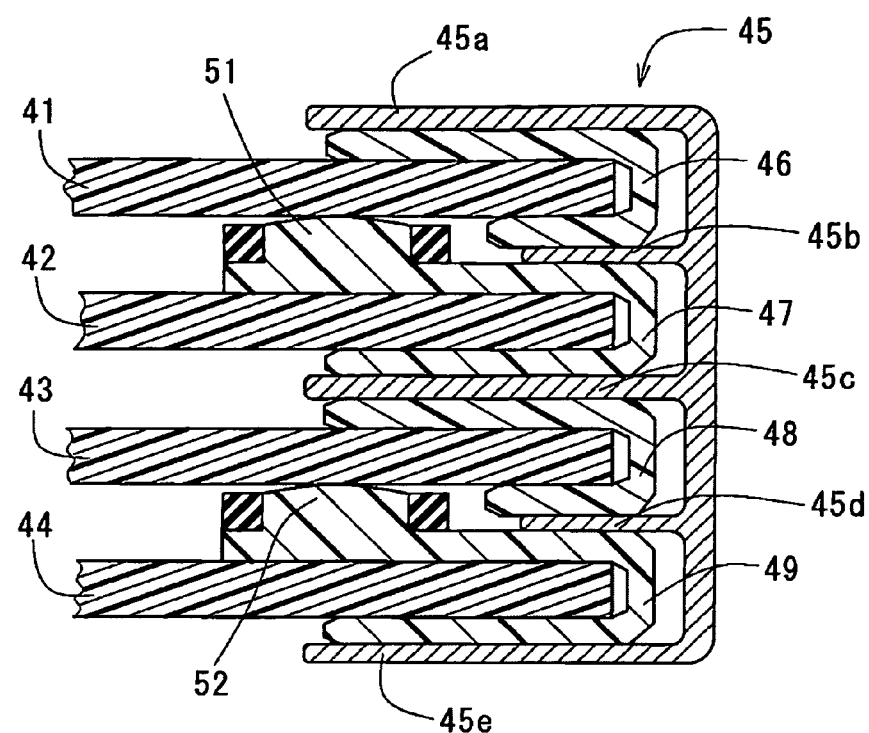
FIG. 6 is a cross-sectional view of a guide rail and engaging shoes, the cross section being perpendicular to a front-rear direction of the vehicle, according to a second embodiment disclosed here.

According to the embodiment, two shade panels are provided, however, the number of the shade panels is not limited. For example, three or more shade panels may be provided by increasing the number of steps of the sliding recessed groove so as to be applicable to, for example, a van type vehicle having a large roof dimension. Alternatively, a modified example of the sunshade for the vehicle having four shade panels, a first shade panel 41, a second shade panel 42, a third shade panel 43, and a fourth shade panel 44 is shown in FIG. 6. FIG. 6 shows a cross-sectional view of a guide rail 45, and the first to fourth shade panels 41-44 on a surface vertical to a front-rear direction of the vehicle. A first extending portion 45a (i.e., serving as an upper extending portion), a second extending portion 45b (i.e., serving as an intermediate extending portion), a third extending portion 45c (i.e., serving as an upper extending portion, a lower extending portion), a fourth extending portion 45d (i.e., serving as an intermediate extending portion), and a fifth extending portion 45e (i.e., serving as a lower extending portion) are formed on the guide rail 45. The shade panels 41 to 44 are supported (retained) by the first through fifth extending portions 45a to 45e via engaging shoes 46 to 49. The third extending portion 45c positioned at a middle portion of the guide rail 45 in the up-down direction of the vehicle serves as the lower extending portion to support a first protruding portion (i.e., serving as an engaging portion) and a second protruding portion 51 (i.e., serving as an engaging portion) together with the first extending portion 45a, and the third extending portion 45c serves as the upper extending portion to support a third protruding portion (i.e., serving as an engaging portion) and a fourth protruding portion 52 (i.e., serving as an engaging portion) together with the fifth extending portion 45e.

According to the embodiment, a sunshade for a vehicle includes a pair of guide rails 14, 45 extended at a side edge of a light passing portion provided on a vehicle roof, the guide rails arranged opposite to each other, plural extending portions 14c, 14d, 14f (45a, 45b, 45c, 45d, 45e) formed on each of the guide rails 14, 45 and extending towards the opposite guide rail, the extending portions defining slide recessed grooves 14a, 14b, a sliding member 17, 21 supported by the extending portions and slidably provided in each of the slide recessed grooves 14a, 14b, an engaging portion (32, 34; 51, 52) formed on said each sliding member 17, 21, and plural shade panels 15, 18 slidably supported in the slide recessed grooves 14a, 14b, respectively, via the sliding member 17, 21, the shade panels 15, 18 being configured to interoperate each other by an engagement of each of the engaging portions during at least one of an opening operation and a closing operation of the sunshade.

According to the construction of the embodiment, because the engaging portion 32, 34 (51, 52) is provided at the sliding member 17, 21 which is supported by the extending portions 14c, 14d, 14f (45a, 45b, 45c, 45d, 45e), a relative displacement between the sliding members 17, 21 which engage each other is restrained to restrain a disengagement of the sliding members 17, 21. Further, because the disengagement of the sliding members 17, 21 is restrained, a height of the engaging portion 32, 34 (51, 52) is reduced, and thus a thickness of the sunshade is reduced.

According to the embodiment, the extending portions 14c, 14d, 14f (45a, 45b, 45c, 45d, 45e) include an upper extending portion 14c (45a, 45c) extending towards the opposite guide rail to overlap with at least a portion of the engaging portions 32, 34 and formed at an upper portion in an upward-downward direction of the vehicle, a lower extending portion 14f (45c, 45e) extending towards the opposite guide rail to overlap with at least a portion of the engaging portions 32, 34 and formed at a lower portion in the upward-downward direction of the vehicle, and an intermediate extending portion 14d (45b, 45d) positioned between the upper extending portion and the lower extending portion in the upward-downward direction of the vehicle and having a shorter extending length compared to the upper extending portion and the lower extending portion. The engaging portion 32, 34 is positioned between the upper extending portion 14c (45a, 45c) and the lower extending portion 14f (45c, 45e) in the upward-downward direction of the vehicle and in the vicinity of a tip end of the intermediate portion extending towards the opposite guide rail.

According to the construction of the embodiment, because the upper extending portion and the lower extending portion overlap with the engaging portion (protruding portion 32, 34, 51, 52), a relative displacement between the engaging portions which engage with each other is restrained to securely support the engaging portions (protruding portion 32, 34, 51, 52). Further, because the engaging portion (protruding portion 32, 34, 51, 52) is positioned in the vicinity of the tip end (the tip end 14i) of the intermediate extending portion 14d, (45b, 45d), an overlap of the intermediate extending portion 14d, (45b, 45d) with the engaging portion (protruding portion 32, 34, 51, 52) in a thickness direction of the sunshade can be avoided, thus reducing a thickness of the sunshade for the vehicle.

According to the embodiment, the engaging portion 32, 34 corresponds to a protruding portion 32, 34 protruding in the upward-downward direction of the vehicle. The sunshade for the vehicle further includes an elastic member 31, 33 configured to contact the protruding portion with respect to an opening and closing direction of the shade panel.

According to the construction of the embodiment, because the protruding portions 32, 34 (51, 52) are provided with the elastic member (elastic member, first rubber member 31, second rubber member 33), an impact when the protruding portions 32, 34 contact one another is mitigated to retrain a generation of noises.

According to the embodiment, an end portion of the protruding portion 32, 34 (51, 52) in the protruding direction in the upward-downward direction of the vehicle protrudes in the protruding direction relative to the elastic member (first rubber member 31, second rubber member 33).

According to the construction of the embodiment, because the end portion of the protruding portion 32, 34 (51, 52) in the protruding direction protrudes in the protruding direction relative to the elastic member and a sliding contact between the elastic member and the shade panel 15, 18 can be prevented, a jam or sticking by a trapping of the elastic member is restrained.

According to the construction of the embodiment, the protruding portion 32, 34 (51, 52) is provided with a retaining groove 35, 36 formed in a recessed configuration on a vertical surface arranged vertical to the opening and closing direction of the sunshade. The elastic member fits into the retaining groove 35, 36 to be retained therein.

According to the construction of the embodiment, the elastic member fits into the retaining groove 35, 36 to be securely retained to the protruding portion 32, 34 (51, 52).

According to the embodiment, the elastic member corresponds to a rubber member (first rubber member 31, second rubber member 33).

According to the embodiment, the sliding member 17, 21 includes a first engaging shoe 17 supported between the upper extending portion 14c (45a, 45c) and the intermediate extending portion 14d (45b, 45d) and a second engaging shoe 21 supported between the lower extending portion 14f (45c, 45e) and the intermediate extending portion 14d (45b, 45d). The plural shade panels 15, 18 include the first shade panel 15 slidably supported by the slide recessed groove 14a via the first engaging shoe and a second shade panel 18 slidably supported by the slide recessed groove 14b via the second engaging shoe. The protruding portion 32, 34 includes the first protruding portion 32 protruding from the first engaging shoe toward the second shade panel and the second protruding portion 34 protruding from the second engaging shoe towards the first shade panel.

According to the embodiment, the vertical surface is formed with a pair of stepped portions recessed in a front-rear direction of the vehicle, and the retaining groove 35, 36 is defined by the stepped portion and the shade panel.

According to the embodiment, the elastic member 31, 33 corresponds to the rubber member having an opening enclosing a surrounding of the protruding portion.

According to the construction of the embodiment, the vertical surface which is vertical to the opening and closing direction is not necessarily formed in a precisely vertical surface in the opening and closing direction, and is defined to include a surface having a deviation of an angle to some extent.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunshade for a vehicle, comprising:
a pair of guide rails extended at a side edge of a light passing portion provided on a vehicle roof, the guide rails arranged opposite to each other;
a plurality of extending portions formed on each of the guide rails and extending towards the opposite guide rail, the extending portions defining slide recessed grooves;
a sliding member supported by the extending portions and slidably provided in each of the slide recessed grooves;
an engaging portion formed on said each sliding member; and
a plurality of shade panels slidably supported in the slide recessed grooves, respectively, via the sliding member, the shade panels being configured to interoperate each other by an engagement of each of the engaging portions during at least one of an opening operation and a closing operation of the sunshade;
wherein the extending portions include an upper extending portion extending towards the opposite guide rail to overlap with at least a portion of the engaging portions and formed at an upper portion in an upward-downward direction of the vehicle, a lower extending portion extending towards the opposite guide rail to overlap with at least a portion of the engaging portions and formed at a lower portion in the upward-downward direction of the vehicle, and an intermediate extending portion positioned between the upper extending portion and the lower extending portion in the upward-downward direction of the vehicle and having a shorter extending length compared to the upper extending portion and the lower extending portion; and
wherein the engaging portion is positioned between the upper extending portion and the lower extending portion in the upward-downward direction of the vehicle and in the vicinity of a tip end of the intermediate portion extending towards the opposite guide rail.

2. A sunshade for a vehicle, comprising:
a pair of guide rails extended at a side edge of a light passing portion provided on a vehicle roof, the guide rails arranged opposite to each other;
a plurality of extending portions formed on each of the guide rails and extending towards the opposite guide rail, the extending portions defining slide recessed grooves;
a sliding member supported by the extending portions and slidably provided in each of the slide recessed grooves;
an engaging portion formed on said each sliding member; and
a plurality of shade panels slidably supported in the slide recessed grooves, respectively, via the sliding member, the shade panels being configured to interoperate each other by an engagement of each of the engaging portions during at least one of an opening operation and a closing operation of the sunshade;
wherein the engaging portion corresponds to a protruding portion protruding in the upward-downward direction of the vehicle; and
wherein the sunshade further comprises an elastic member configured to contact the protruding portion with respect to an opening and closing direction of the shade panel.

3. The sunshade for the vehicle according to claim 2, wherein an end portion of the protruding portion in the protruding direction in the upward-downward direction of the vehicle protrudes in the protruding direction relative to the elastic member.

4. The sunshade for the vehicle according to claim 2, wherein the protruding portion is provided with a retaining groove formed in a recessed configuration on a vertical surface arranged vertical to the opening and closing direction of the sunshade; and wherein
the elastic member fits into the retaining groove to be retained therein.

5. The sunshade for the vehicle according to claim 2, wherein the elastic member corresponds to a rubber member.

6. The sunshade for the vehicle according to claim 2, wherein
the sliding member includes a first engaging shoe supported between the upper extending portion and the intermediate extending portion and a second engaging shoe supported between the lower extending portion and the intermediate extending portion;
the plurality of shade panels include a first shade panel slidably supported by the slide recessed groove via the first engaging shoe and a second shade panel slidably supported by the slide recessed groove via the second engaging shoe; and
the protruding portion includes a first protruding portion protruding from the first engaging shoe toward the second shade panel and a second protruding portion protruding from the second engaging shoe towards the first shade panel.

7. The sunshade for the vehicle according to claim 4, wherein the vertical surface is formed with a pair of stepped portions recessed in a front-rear direction of the vehicle, and the retaining groove is defined by the stepped portion and the shade panel.

8. The sunshade for the vehicle according to claim 5, wherein the elastic member corresponds to a rubber member having an opening enclosing a surrounding of the protruding portion.

* * * * *